No. 859,361. PATENTED JULY 9, 1907.
B. A. BEHREND.
ROTOR FOR HIGH SPEED DYNAMO ELECTRIC MACHINES.
APPLICATION FILED NOV. 30, 1906.
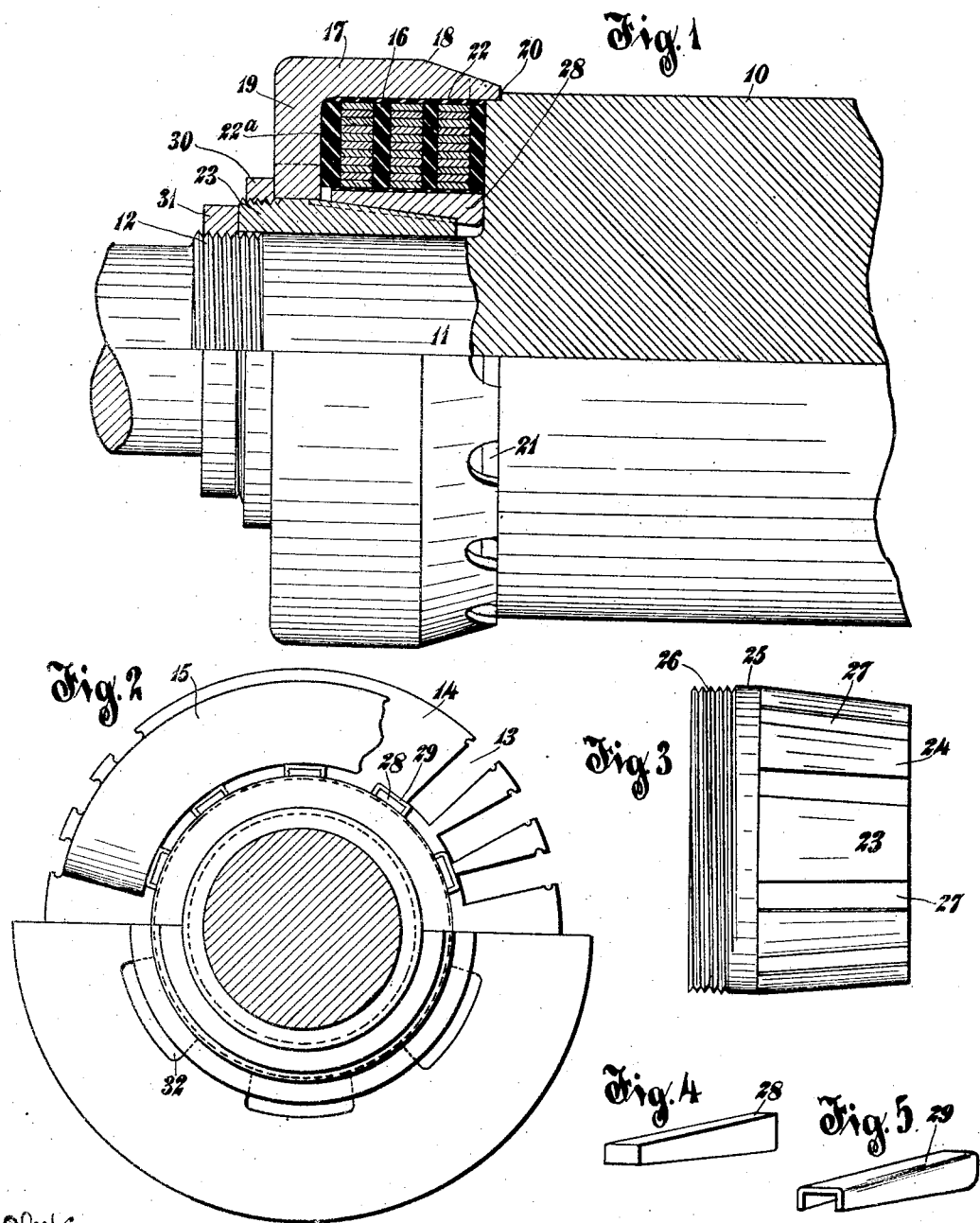
Witnesses
Inventor
Bernard A. Behrend
By
Chas. E. Lord
Attorney

UNITED STATES PATENT OFFICE.

BERNARD A. BEHREND, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

ROTOR FOR HIGH-SPEED DYNAMO-ELECTRIC MACHINES.

No. 859,361.      Specification of Letters Patent.      Patented July 9, 1907.

Application filed November 30, 1906. Serial No. 345,603.

*To all whom it may concern:*

Be it known that I, BERNARD A. BEHREND, a citizen of the United States, residing at Norwood, in the county of Hamilton and State of Ohio, have invented certain new and useful Improvements in Rotors for High-Speed Dynamo-Electric Machines, of which the following is a full, clear, and exact specification.

My invention relates to dynamo-electric machines and particularly to the rotating members of high speed machines such as rotary field members of turbo-alternators.

The object of my invention is to provide a compact rotor structure consisting of few parts, which are held firmly in position so that there can be no displacement or movement of the same at high speeds.

My invention consists in certain novel details of construction and combinations and arrangements of parts described in the specification and set forth in the appended claims.

For a better understanding of my invention, reference is had to the accompanying drawings, in which Figure 1 is a partial sectional elevation of a rotating field member of a high speed alternator equipped with my invention; Fig. 2 is a sectional end elevation of the same, parts being removed and broken away for the sake of clearness; Fig. 3 is an elevation of one of the supporting members of my improved structure; Fig. 4 is a perspective of one of the coil supporting wedges; and Fig. 5 is a similar view of one of the wedge insulating shoes.

Referring now to the figures of the drawing, 10 represents a cylindrical core having in this case integral shaft projections 11, the core and shaft projections being made from a solid forging. Only one end of the core and a shaft projection is shown in this case. It is to be understood however that the opposite end of the core is similar to that shown. The shaft projections may consist of separate members secured to the ends of the core or the rotor may be provided with a single shaft extending entirely through the core, which may also if desired be constructed of disks or laminæ. In this instance the shaft projection 11 is cylindrical and is provided with an outer threaded portion 12.

The core is provided with radial slots 13 and pole pieces 14, a two pole rotor being here shown. Located in the radial slots are the coils of the rotor winding. The coils are concentrically arranged in a group about each pole-piece and are provided with end-turns 15 which extend outward beyond the core 10 over each shaft projection 11, the depth of the slots being such as to leave a sufficient space between the inner portions of the coils and the shaft projection for coil supporting members. The end-turns of the coils are spaced from each other and from the core by insulating blocks 16.

In order that the end-turns of the coils may not be injured or displaced by centrifugal action I surround the end-turns at each end of the core by a rigid end-ring or end-member 17 made from some material such as phosphor-bronze or nickel steel. Each end-member 17 is provided in this case with a cylindrical or annular portion 18, and with an integral portion 19 at right angles to the cylindrical portion and extending inwardly over the outer ends of the coils. I do not wish to be confined to a structure in which the protecting end-member consists of the cylindrical portion and the inwardly extending portion in one integral piece, as, if desired, the inwardly extending portion may be a spearate member engaging or fastened to the annular portion. As is shown the inner edge of the cylindrical portion 18 of the end-member fits within an annular groove 20 at the outer edge of the core, and is provided with notches 21 forming ventilating openings. The cylindrical portion 18 of the end-member is separated from the coils by suitable insulation 22 and the inwardly extending portion is separated from the outer coil of each concentric group by insulating spacing blocks 22ᵃ.

Resting upon the cylindrical portion 11 of the shaft is a sleeve 23 shown in detail in Fig. 3. As will appear later this sleeve serves to support and adjust the coil supporting wedges and to support and center the end-member 17. The sleeve is provided with an inclined portion 24 extending within the coils, and with a cylindrical portion 25, the outer end 26 of which is threaded and extends outward beyond the end-member. The inclined portion of the sleeve is provided with a plurality of grooves or slots 27 for receiving coil supporting wedges 28. Fitting closely over each wedge 28 is an insulating shoe or channel-shaped member 29 which may be pressed into shape from fish-paper or other suitable sheet insulation, or may be molded into any desired shape from plastic insulating material. Shoes 29 insulate the coils from the wedges but do not interfere with the circulation of air between and around the end-turns of the coils as would be the case if the wedges and coils were separated by sheets of insulating material. As is shown the inwardly extending portion 19 of the end-member is supported and centered on the cylindrical portion 25 of the sleeve, and is clamped and retained in position by a nut 30 which engages the threaded portion 26 of the sleeve. By means of the nut 30 the end-member and end-turns can be forced inward in an axial direction. The sleeve 23 is retained in position and can be adjusted axially of the machine by a nut 31 which engages the threaded portion 12 of the shaft projection. Thus when it is desired to adjust the pressure of the coils against the end-member 17, all that is necessary is to adjust the position of the sleeve 23, by turning the nut 31.

The inwardly extending portion 19 of the end-member is provided adjacent the sleeve 23 with a plurality of spaced ventilating openings 32 which permit a good circulation of air to take place through and around the end-turns of the coils when the rotor is in motion.

It is seen that the rotor here shown consists of few parts and is very simple in construction and compact. Furthermore all the parts can be tightly clamped and retained in position so that they can not be displaced or injured.

I do not desire to be confined to the exact details shown but aim in my claims to cover all modifications which come within the spirit and scope of my invention.

What I claim as new and desire to secure by Letters Patent is:—

1. In a rotor of a dynamo-electric machine, a core, coils carried thereby, said coils having end-turns projecting beyond the core, an end-member surrounding the end-turns, and means for forcing the end-turns outward against the end-member, said end-member being centered on said means.

2. In a rotor of a dynamo-electric machine, a core, coils carried thereby, said coils having end-turns projecting beyond the core, an end-ring surrounding the end-turns, said ring having a cylindrical portion and an inwardly extending portion at right angles thereto, and means comprising a member having an inclined surface for forcing the end-turns outward against said ring, the inwardly extending portion of the end-ring resting on said member.

3. In a rotor of a dynamo-electric machine, a core, coils carried thereby, said coils having end-turns projecting beyond the core, an end-member surrounding the end-turns, means comprising a sleeve having an inclined portion extending within the coils for forcing the latter outward against the end-member, and a nut on the sleeve and bearing against the end-member for holding the latter in position.

4. In a rotor of a dynamo-electric machine, a core, coils carried thereby, said coils having end-turns projecting beyond the core, an end-ring surrounding the end-turns, said end-ring having a cylindrical portion, and a portion extending inward over the ends of the coils, a sleeve having an inclined portion extending within the projecting portions of the coils for forcing the latter outward against the cylindrical portion of the ring, said sleeve serving as a support for the inwardly projecting portion of the ring, and a nut on said outer end of the sleeve for holding the ring in position.

5. In a rotor of a dynamo-electric machine, a core, coils carried thereby, said core having shaft projections, coils carried by said core and projecting beyond the ends thereof, an end-ring surrounding the projecting portions of the coils at each end of the core, means for forcing the end-turns outward against the end-ring comprising a plurality of wedges and a sleeve resting upon the shaft projection, a portion of said sleeve extending outward beyond the coils and supporting the end-ring.

6. In a rotor of a dynamo-electric machine, a core, coils carried by said core, said coils having end-turns projecting beyond the end thereof, a ring surrounding the coils, means for forcing said end-turns outward against said ring comprising a sleeve having an inclined outer surface, said sleeve extending outward beyond the ring, and means for adjusting said sleeve axially of the shaft.

7. In a rotor of a dynamo-electric machine, a core having a shaft projection, coils carried by said core projecting beyond the end thereof, a ring surrounding the coils, means for forcing the coils outwardly against the ring, comprising a sleeve having an inclined surface, said sleeve extending outwardly beyond the ring and forming a support therefor, means on the shaft projection for holding the sleeve in position, and means on said sleeve for holding the ring in position.

In testimony whereof I affix my signature, in the presence of two witnesses.

BERNARD A. BEHREND.

Witnesses:
 LILLIAN J. BRITTON,
 LAURA E. WELCH.